United States Patent
Triebe et al.

(10) Patent No.: US 12,180,959 B2
(45) Date of Patent: Dec. 31, 2024

(54) GEAR PUMP WITH INTERMESHING GEAR WHEELS ENCLOSED BY HOUSING WITH BEARING JOURNALS ARRANGED ON SHAFT AXES AND USE THEREOF

(71) Applicant: MAAG PUMP SYSTEMS AG, Oberglatt (CH)

(72) Inventors: René Triebe, Schwerzenbach (CH); Marc Finkeldei, Brugg (CH)

(73) Assignee: MAAG PUMP SYSTEMS AG, Oberglatt (CH)

( * ) Notice: Subject to any disclaimer, the term of this patent is extended or adjusted under 35 U.S.C. 154(b) by 0 days.

(21) Appl. No.: 18/287,999

(22) PCT Filed: Mar. 7, 2022

(86) PCT No.: PCT/EP2022/055752
§ 371 (c)(1),
(2) Date: Oct. 23, 2023

(87) PCT Pub. No.: WO2022/228761
PCT Pub. Date: Nov. 3, 2022

(65) Prior Publication Data
US 2024/0200557 A1 Jun. 20, 2024

(30) Foreign Application Priority Data
Apr. 30, 2021 (EP) .................................... 21171421

(51) Int. Cl.
*F04C 18/08* (2006.01)
*F01C 21/04* (2006.01)
(Continued)

(52) U.S. Cl.
CPC .............. *F04C 18/084* (2013.01); *F04C 2/08* (2013.01); *F04C 15/00* (2013.01); *F04C 29/02* (2013.01); *F16C 33/10* (2013.01); *F04C 2240/50* (2013.01)

(58) Field of Classification Search
CPC ........ F04C 29/02; F04C 18/084; F04C 15/00; F04C 2/08; F01C 21/04; F16C 33/10
See application file for complete search history.

(56) References Cited

U.S. PATENT DOCUMENTS 2,891,483 A  6/1959 Murray et al.
6,338,575 B1 * 1/2002 Chen .................... F16C 33/103
                                                    384/279

(Continued)

FOREIGN PATENT DOCUMENTS

DE      2005740 A1   9/1970
DE     10135709 C1   2/2003
(Continued)

OTHER PUBLICATIONS

English copy of FR2882409 by PE2E Oct. 12, 2024.*
(Continued)

*Primary Examiner* — Deming Wan
(74) *Attorney, Agent, or Firm* — Procopio, Cory, Hargreaves & Savitch LLP

(57) ABSTRACT

Gear pump with intermeshing gear wheels enclosed by a housing with bearing journals arranged on shaft axes, each projecting laterally from the gear wheels, which are mounted in the housing by means of slide bearings, having a slide bearing length, the slide bearings being lubricated with pumped medium. The invention is characterized in that a filling pocket with radial expansion is incorporated in each of the slide bearings in the region of a pump pressure side, the filling pocket being spaced from a gear-side end face of the respective slide bearing by a distance, so that a bar with (Continued)

a bar width with axial expansion corresponding to a slide bearing surface is formed, and in that a lubrication groove with a tampering cross-section is provided in each of the slide bearings, the lubricating groove starting from an end on the gearwheel side towards a slide bearing end and starting at the filling pocket on the gearwheel side and communicating therewith.

11 Claims, 2 Drawing Sheets

(51) Int. Cl.
*F04C 2/08* (2006.01)
*F04C 15/00* (2006.01)
*F04C 29/02* (2006.01)
*F16C 33/10* (2006.01)

(56) References Cited

U.S. PATENT DOCUMENTS

2014/0369634 A1* 12/2014 Kane .................... C22C 9/06
                                                     384/322
2017/0204854 A1* 7/2017 Afshari ............... F04C 15/0096

FOREIGN PATENT DOCUMENTS

EP       0833068 A1      4/1998
FR       2882409 A1 *    8/2006  .............. F16C 17/02

OTHER PUBLICATIONS

International Search Report and Written Opinion received in corresponding International Application No. PCT/EP2022/055752, mailed Jun. 8, 2022, in 15 pages, with translation.

* cited by examiner

GEAR PUMP WITH INTERMESHING GEAR WHEELS ENCLOSED BY HOUSING WITH BEARING JOURNALS ARRANGED ON SHAFT AXES AND USE THEREOF

CROSS-REFERENCE TO RELATED APPLICATIONS

This application is a US national stage application of International Application No. PCT/EP2022/055752, filed Mar. 7, 2022, which claims the benefit of EP Application No. 21171421.7, filed Apr. 30, 2021, the contents of which are incorporated by reference.

TECHNICAL FIELD

The present invention relates to a gear pump according to the pre-characterizing part of claim 1 and to a use of the gear pump according to claim 10.

STATE OF THE ART

Gear pumps essentially consist of a pair of intermeshing gears enclosed in a housing, from each of which protrude bearing journals arranged laterally about the longitudinal axis and seated in slide bearings lubricated by the pumped medium.

Since gear pumps have a conveying-stiff characteristic curve, they are particularly suitable for transporting pumped media from a suction side to a pressure side. Due to the volume flow conveyed in the downstream units, a pressure gradient is created between the pressure side and the suction side, which gradient is particularly large in the case of highly viscous media and leads to a force transmission to each gear wheel.

A known gear pump is described, for example, in EP-1 790 854 A1, being a gear pump in which a bearing journal diameter is close to or equal to a root diameter of the gear teeth.

The known gear pumps have slide bearings, which are lubricated with the pumped medium. The high pressure on the gear pump outlet side is applied to the slide bearings on one side, while the pressure on the gear pump suction side downstream of the slide bearing is significantly lower than the pressure on the pump outlet side. This pressure difference causes pumped medium, which is required for the lubricant film buildup in the slide bearing, to flow from the pump outlet into the slide bearing. A pressure lubrication groove in the end face of the slide bearing forms a direct connection into the slide bearing in order to guide the pumped medium in a lubrication groove in the slide bearing into the slide bearing with as little interference as possible.

If a polymer melt is used as the pumped medium, which is also mixed with high proportions of solids or with solids above a critical size (foreign particles), this presents a difficulty for sufficient lubrication in the slide bearing. For good functioning of the slide bearings, it is important to build up a lubricating film of pumped medium. If too many or too large foreign particles get into the narrow lubrication gap between the shaft and the slide bearing, there is a risk of damage to the slide bearing or the shaft, leading to failure of the gear pump. This is particularly the case if the particle size is larger than the height of the minimum lubricant film, because this leads to an interruption of the lubricant flow due to clogging in the slide bearing and thus to a failure of the gear pump. Increased flow of particle-laden melt (pumped medium) can also lead to increased abrasive wear of the slide bearing surfaces. If too little melt reaches the slide bearing, there is a risk of insufficient lubrication.

Furthermore, when a polymer is used as the conveying medium, unmelted polymer particles (small lumps) that enter the slide bearing via the lubrication groove can block the lubrication flow and cause the gear pump to fail.

SUMMARY OF THE INVENTION

It is therefore an object of the present invention to provide a gear pump which does not have at least one of the above-mentioned disadvantages.

This task is solved by the features indicated in the characterizing part of claim 1. Further embodiments of the present invention as well as a use are defined in further dependent claims.

A gear pump according to the present invention firstly comprises a gear pump with intermeshing gears enclosed by a housing with bearing journals arranged on shaft axes, each projecting laterally from the gears, which are mounted in the housing by means of slide bearings, having a slide bearing length, the slide bearings being lubricated by pumped medium. The present invention is characterized in that,

- a filling pocket with radial expansion is incorporated in each of the slide bearings in the region of a pump pressure side, the filling pocket being spaced apart from a gear-side end face of the respective slide bearing by a distance, so that a bar with a bar width with axial expansion corresponding to a slide bearing surface is formed, and
- a lubricating groove with a tapering cross-section is provided in each of the slide bearings, starting from an end on the gearwheel side towards a slide bearing end, the lubricating groove starting on the gearwheel side at the filling pocket and communicating therewith.

The gear pump according to the invention is thus much more robust compared to known gear pumps, because with a polymer as the conveying medium, molten polymer particles (small lumps) can still get into the lubrication groove in the slide bearing. The lubrication flow is therefore far less blocked, which means that the probability of failure of the gear pump according to the invention is significantly lower.

One embodiment variant of the gear pump according to the invention is characterized in that the distance between the end face of the slide bearings and the respective filling pocket is 5% to 10%, preferably 7%, of the slide bearing length.

Further embodiments of the gear pump according to the invention consist in the bar width D being 1% to 10%, preferably 3%, of the slide bearing length L.

Further embodiments of the gear pump according to the invention consist in the filling pocket having a maximum width in the axial direction with respect to the shaft axis which is 5% to 20%, preferably 10%, of the slide bearing length.

Still further embodiments of the gear pump according to the invention consist in the filling pocket starting at an angle of 225° to 315°, preferably at 270°, with respect to a plane spanned by the two shaft axes and in the direction of rotation of the gears.

Further embodiments of the gear pump according to the invention consist in the filling pocket ending at an angle of 315° to 360°, preferably at 330°, with respect to a plane spanned by the two shaft axes and in the direction of rotation of the gears.

Further embodiments of the gear pump according to the invention consist in the fact that a cross-section in the transition region from the filling pocket to the lubrication groove is of continuous design.

Further embodiments of the gear pump according to the invention consist in the lubrication groove running at an acute angle with respect to the shaft axis in the direction of the slide bearing end.

Further embodiments of the gear pump according to the invention consist in the lubrication groove extending to the end of the slide bearing.

Further embodiments of the gear pump according to the invention consist in at least one of the bearing journals having, at least over part of its axial extent, a bearing journal diameter which lies in the range from 90% to 100% of a root diameter of the teeth of the associated gear.

Finally, the present invention comprises a use of the gear pump according to one or more of the above embodiments for conveying highly viscous conveyed medium, such as polymer, with a mass percentage of fillers (e.g. titanium dioxide $TiO_2$, calcium carbonate, wood flour, stone, chalk, tallow, talc, silicates, carbons, in particular in the form of carbon black) of more than 60% of the total mass of conveyed medium.

The mentioned embodiments of the present invention can be combined in any order. Only those combinations of embodiments are excluded which would lead to a contradiction by the combination.

BRIEF DESCRIPTION OF THE FIGURES

Examples of embodiments of the present invention are explained in further detail below with reference to figures. These are for explanatory purposes only and are not to be construed restrictively. They show.

DETAILED DESCRIPTION OF THE INVENTION

Figure 1:
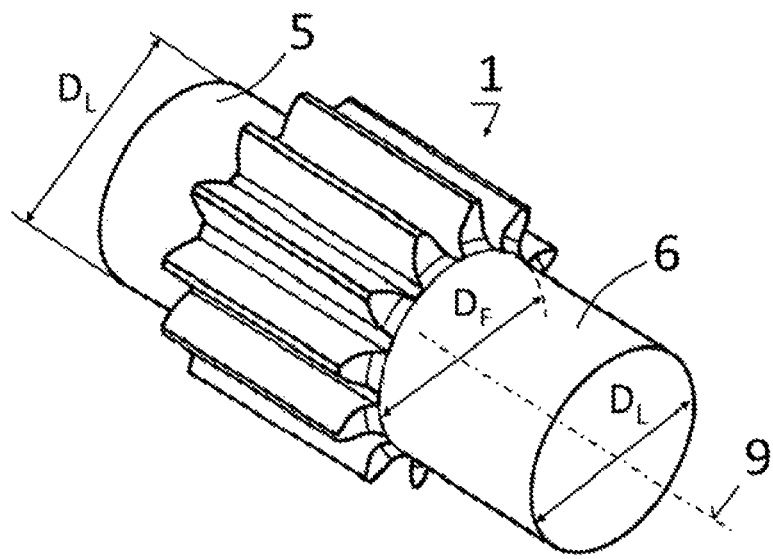
FIG. 1 a known gear wheel with bearing journals for a gear pump according to the invention in perspective view, FIG. 2 a section transverse to the shaft axis according to section line B-B in FIG. 3 through a slide bearing according to the invention, FIG. 3 a section through the shaft axis according to section line C-C in FIG. 2 through the slide bearing according to the invention shown in FIG. 2, and FIG. 4 a top view of a filling pocket incorporated in the slide bearing according to the invention with adjoining lubrication groove.

FIG. 1 shows a perspective view of a gear wheel 1 known per se with journals 5 and 6 for a gear pump according to the invention. Over part of their axial extent, the journals 5 and 6 have a journal diameter $D_L$ which is approximately as large as a root circle diameter $D_F$ of the toothing. At least the journal diameter $D_L$ is in the range of 90% to 100% of the root diameter $D_F$. Of course, this also applies to the journals of the second gear wheel not shown in FIG. 1.

Figure 2:
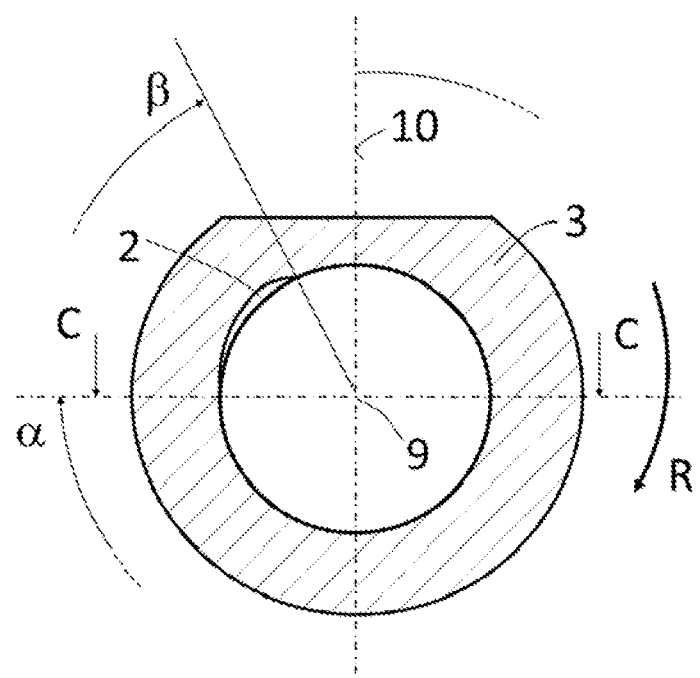
Figure 3:
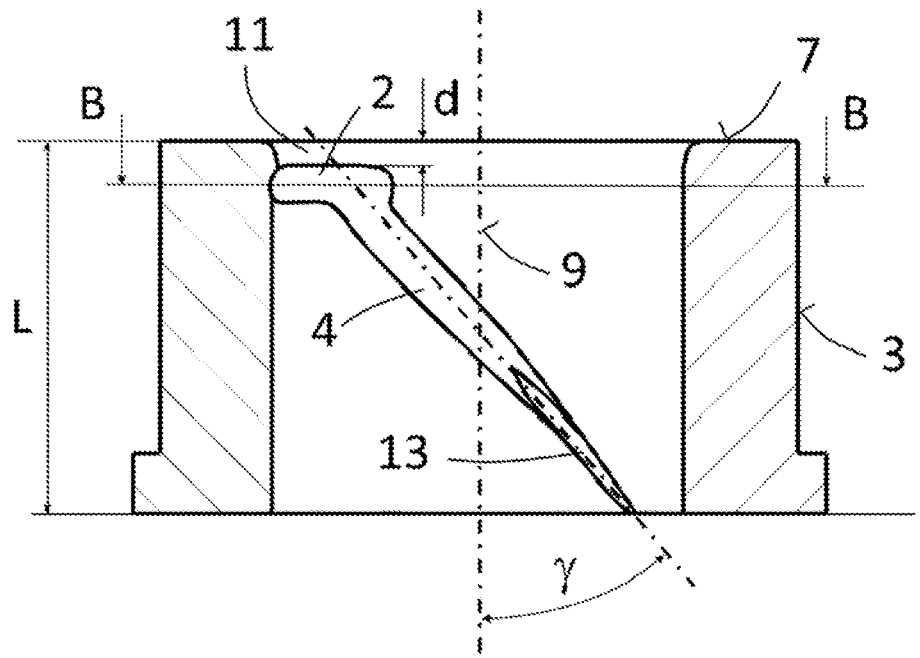

FIG. 2 shows a cross-section through a slide bearing 3 according to the present invention. The sectional area is transverse to the shaft axis 9 and centered through a filling pocket 2 according to the present invention, which is incorporated in the sliding surface of the slide bearing 3 according to the present invention. The cut surface is also shown in FIG. 3, which will be explained later, and is designated there as cut surface B-B.

As can already be seen from FIG. 2, the filling pocket 2 is spaced from a gear-side end face 7 of the slide bearing so that there is a bar 11, to be explained later, with radial extension corresponding to the sliding surface of the slide bearing 3. The position of the filling pocket 2 is defined below by angles around the shaft axis 9, i.e., the shaft axis 9 is defined as the origin in the section shown in FIG. 2. Furthermore, angles are given in relation to an angular reference plane 10, which is spanned by the two shaft axes of the gear pump. In FIG. 2, in which a section transverse to the shaft axis 9 is shown, the reference plane 10 can be seen as a line running upwards, whereby the reference direction for angle indications (0° angle) is a ray which, on the one hand, starts from the origin (shaft axis 9) and which, on the other hand, runs perpendicularly through the second shaft axis (not shown in FIG. 2). Angles specified in the direction of rotation R of the shaft are positive and angles specified against the direction of rotation are therefore negative.

Based on these definitions, a start of the filling pocket 2 with a start angle α and the end of the filling pocket 2 with an end angle β can be specified. It has been found that in a first embodiment, the starting angle α is in a range of 225° to 315°, and in a specific embodiment, the starting angle α is equal to 270°. The end angle R is in a range of 315° to 360°, wherein in a specific embodiment the end angle β is equal to 330°.

In one embodiment of the present invention, the filling pocket 2 has a small cross-section at the beginning, i.e., in the region of the starting angle α, which becomes larger as the angle increases and which in turn decreases towards the end angle β. This can already be clearly seen from the section through the filling pocket 2 shown in FIG. 2.

FIG. 3 shows a section through the shaft axis 9 according to the sectional plane C-C indicated in FIG. 2 through the slide bearing 3 according to the invention. The filling pocket 2 and the lubricating groove 4 communicating with it can be clearly seen, which in the embodiment shown is worked into the sliding surface of the slide bearing 3 at an angle γ with respect to the shaft axis 9 of the slide bearing 3. The lubricating groove 4 has the task of supplying the slide bearing 3 sufficiently with lubricant—i.e. pumping medium—so that a lubricating film between the shaft and the slide bearing—in the so-called lubricating gap—does not break off. For this purpose, the lubrication groove 4 is designed to taper, i.e. its cross-section, which initially corresponds to the cross-section of the filling pocket 2, decreases towards the sealing side. In the embodiment of the invention shown in FIG. 3, a so-called dirt groove 13 is incorporated in the last third of the lubrication groove 4, which has a substantially constant cross-section and is open towards the "rear" and ensures that foreign particles are flushed out of the slide bearing 3. The cross-section of the dirt groove is therefore dimensioned in such a way that the largest foreign particles to be expected in the pumped medium can be flushed out. This prevents clogging of the dirt groove and thus also of the lubrication groove 4.

Figure 4:
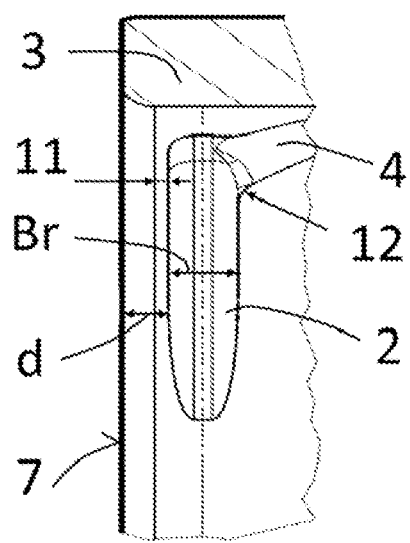

FIG. 4 shows a top view of the filling pocket 2 incorporated in the slide bearing 3 according to the invention. Part of the lubrication groove 4 connected to the filling pocket 2 is also visible.

Of decisive importance for the present invention is the fact that the filling pocket 2 is spaced from the end face of the slide bearing 3 to such an extent that a bar 11 with an axial extent corresponding to the surface of the plain bearing 3 remains. This ensures that foreign bodies larger than the sealing gap cannot enter the filling pocket 2 and thus also the lubrication groove 4. Consequently, clogging of the lubrication groove 4 can be largely prevented, resulting in a significantly lower probability of failure of the gear pump.

The gear pump according to the invention is thus considerably more robust than known gear pumps.

The gear pump according to the invention can therefore also optimally process pumped media, such as polymer melts with a high proportion of solids or with solids above a critical size (foreign particles), which was not the case until now. The bar 11 prevents too many or too large foreign particles from entering the narrow lubrication gap between the shaft and the slide bearing 3. The bar 11 thus acts as a kind of filter that only allows foreign particles up to a certain size to pass through. If the lubrication groove 4 and the dirt groove, if any, are dimensioned according to the size of the foreign particles that are just allowed to pass through, an extremely robust gear pump is obtained, because clogging of the lubrication groove 4 and thus breaking off of the lubricating film in the slide bearing 3 are prevented.

The geometry of the filling pocket 2 is such that it initially becomes deeper in the direction of rotation of the shaft, i.e. the cross-section increases in the direction of rotation of the shaft.

In further embodiments of the present invention, the filling pocket 2 has a maximum width Br in the axial direction with respect to the shaft axis 9, which is 5% to 20%, preferably 10%, of the slide bearing length L. Here, a distance d between the end face of the slide bearings 3 and the respective filling pocket 2 can be, for example, 5% to 10%, preferably 7% of the slide bearing length L. The distance d can be maintained, for example, over a substantial part of the unwound extent of the filling pocket 2, i.e. over more than 50%, in particular over more than 80%, of the unwound extent of the filling pocket 2. Furthermore, the distance d may comprise any radius in the case of a rounded transition from the end face to the sliding bearing surface. It is important in the presence of a rounded transition from the end face to the sliding bearing surface that the bar 11 has a bar width D in the axial direction at the level of the sliding bearing surface, the bar width D being at least 1% to 10%, preferably 3%, of the sliding bearing length L.

LIST OF REFERENCE SIGNS 1 gear wheel
2 filling pocket
3 slide bearing
4 lubrication groove
5, 6 bearing journal
7 gear-side end face
R direction of rotation of the shaft
9 shaft axis
10 angular reference plane
11 bar
12 transition area
13 Dirt groove
α start angle
β end angle
γ tilt angle
$D_L$ bearing journal diameter
$D_F$ root circle diameter of the toothing
L slide bearing length
Br width
d distance of the filling pocket from the face of the slide bearing
D bar width

The invention claimed is:

1. Gear pump with intermeshing gear wheels (1) enclosed by a housing with bearing journals (5, 6) arranged on shaft axes (9), each projecting laterally from the gear wheels (1), which are mounted in the housing by means of slide bearings (3), having a slide bearing length (L), the slide bearings (3) being lubricated with pumped medium, characterized in that:
  a filling pocket (2) with radial expansion is incorporated in each of the slide bearings (3) in a region of a pump pressure side, the filling pocket (2) being spaced apart from a gear-side end face (7) of the respective slide bearing (3) by a distance (d), so that a bar (11) with a bar width (D) with axial expansion corresponding to a slide bearing surface is formed; and
  a lubricating groove (4) with a tampering cross-section is provided in each of the slide bearings (3), the lubricating groove (4) starting from an end on a gearwheel side towards a slide bearing end and starting at the filling pocket (2) on the gearwheel side and communicating therewith.

2. The gear pump according to claim 1, characterized in that the distance (d) between the gear-side end face (7) of the slide bearings (3) and the respective filling pocket (2) is 5% to 10%, preferably 7%, of the slide bearing length (L).

3. The gear pump according to claim 1, characterized in that the bar width (D) is at least 1% to 10%, preferably 3%, of the slide bearing length (L).

4. The gear pump according to one claim 1, characterized in that the filling pocket (2) has a maximum width (Br) in an axial direction with respect to the shaft axis (9) which is 5% to 20%, preferably 10%, of the slide bearing length (L).

5. The gear pump according to claim 1, characterized in that the filling pocket (2) starts at an angle of 225° to 315°, preferably at 270°, with respect to a plane spanned by the two shaft axes (9) and in a direction of rotation of the gear wheels.

6. The gear pump according to claim 1, characterized in that the filling pocket (2) ends at an angle of 315° to 360°, preferably at 330°, with respect to a plane spanned by the two shaft axes (9) and in the direction of rotation of a gear wheels (1).

7. The gear pump according to claim 1, characterized in that a cross-section in a transition region (12) from the filling pocket (2) to the lubrication groove (4) is formed continuously.

8. The gear pump according to claim 1, characterized in that the lubrication groove (4) runs at an acute angle (γ) with respect to the shaft axis (9) in a direction of the slide bearing end.

9. The gear pump according to claim 1, characterized in that the lubricating groove (4) extends to the end of the slide bearing.

10. The gear pump according to claim 1, characterized in that at least one of the journals (5, 6) has, at least over part of its axial extent, a journal diameter ($D_L$) which lies in a range from 90% to 100% of a root circle diameter ($D_F$) of a toothing of an associated gear wheel (1).

11. Use of the gear pump according to claim 1 for conveying highly viscous conveying medium, such as polymer, with a mass percentage of inorganic fillers in total mass of conveying medium of more than 60%.

* * * * *